Dec. 8, 1925.
E. DAVIS
1,564,535
OIL GAUGE
Filed June 11, 1923
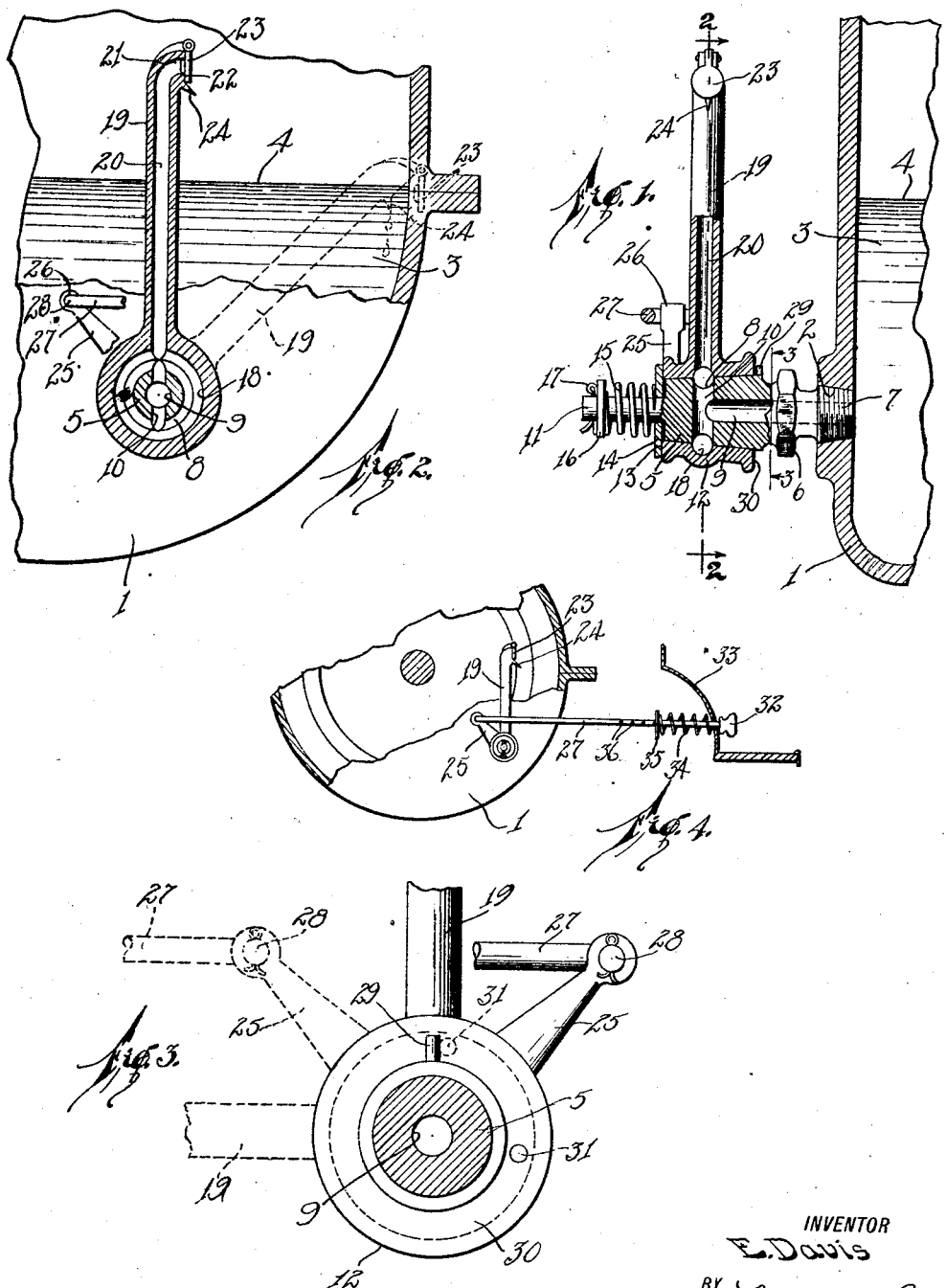
INVENTOR
E. Davis
BY
ATTORNEYS Patented Dec. 8, 1925.

1,564,535

UNITED STATES PATENT OFFICE.

ERNEST DAVIS, OF CHICAGO, ILLINOIS.

OIL GAUGE.

Application filed June 11, 1923. Serial No. 644,769.

*To all whom it may concern:*

Be it known that I, ERNEST DAVIS, a citizen of the United States, and a resident of Chicago, in the county of Cook and State of Illinois, have invented a new and useful Improvement in Oil Gauges, of which the following is a full, clear, and exact description.

My invention relates to improvements in oil gauges for determining the level of oil in an oil reservoir, such as employed in the ordinary type of motor vehicle splash oiling system, and it consists in the combinations, constructions, and arrangements herein described and claimed.

An object of my invention is to provide an oil gauge of the character described which may be manipulated for observation of the oil level from a point on the outer side of the running board shield. It is well known that in certain types of motor vehicles which employ this splash oil system, it is necessary to reach down beneath the crank case and to manually actuate a pet cock to observe the level of the oil. This operation is difficult and often results in the hands or clothing of the driver becoming soiled by contact with the crank case or under portions of the vehicle.

A further object of my invention is to provide a device of the character described which is automatically moved to an inoperative position when the hand grip for operating the gauge is released.

A further object of my invention is to provide an oil gauge of the character described in which a novel means is employed for preventing the oil which drips from the spout of the gauge from running back on the exterior wall of the spout where it may not be observed upon emission from the spout.

A further object of my invention is to provide an oil gauge of the character described which may not move out of its inoperative position by virtue of the vibration of the motor vehicle.

A further object of my invention is to provide an oil gauge in which the moving parts are yieldably held into close engagement with one another so that no oil may escape.

A further object of my invention is to provide an oil gauge of the character described which may be inserted in the threaded opening ordinarily provided for a pet cock, by means of which the driver has means for observing the quantity of oil above the pet cock.

Other objects and advantages will appear in the following specification, and the novel features of the invention will be particularly pointed out in the appended claim.

My invention is illustrated in the accompanying drawings, forming part of this application, in which—

Figure 1 is a sectional view of an embodiment of my invention,

Figure 2 is a sectional view along the line 2—2 of Figure 1,

Figure 3 is a sectional view along the line 3—3 of Figure 1, and

Figure 4 is a diminutive view of my improved oil gauge and the control mechanism therefor.

In carrying out my invention, I make use of a motor vehicle having a reservoir 1. This reservoir ordinarily constitutes a portion of the crank case and transmission housing. Oil is maintained at a predetermined level in this crank case and operation of the crank shaft and the transmission mechanism serves to splash the oil to the bearings and other portions of the engine which need lubrication. The crank case 1 is also provided with a threaded opening 2 therethrough. This opening is below the proper and predetermined level of the oil 3 within the crank case, the predetermined level of the oil being indicated at 4. A conical body member 5, having a hexagonal nut portion 6 intermediate its length and a threaded portion 7 at the end thereof, is disposed with the threaded portion 7 in the threaded bore 2 of the crank case. The tapered body member 5 is therefore disposed with its longitudinal axis perpendicular to the side walls of the crank case 1.

The conical body member 5 has an annular groove 8 extending around the entire circumference thereof intermediate its length (see Figure 2) and a bore 9 extending longitudinally therethrough from the threaded portion 7 to a point adjacent the annular groove 8. A transverse passage 10 is disposed through the tapered body member 5 and serves as a means for connecting the bore 9 with the annular grooves 8 so that the oil 3 from the crank case may pass through the bore 9, the passage 10, and into the annular groove 8.

The body portion 5 is provided with a longitudinally extending reduced projection 11 at the outer end thereof. A sleeve 12, having a tapered bore corresponding to the tapered side walls of the body member 5, is disposed upon the body member 5 and arranged so that its outer end 13 overlies the outer end of the body portion 5. A washer 14 is disposed over the projection 11 and a spiral compression spring 15 is mounted concentric with the projection on the outer side of the washer 14.

A second washer 16 is disposed on the other side of the compression spring 15 and a cotter pin 17 is projected transversely through the member 11 on the outer side of the washer 16. This structure causes the sleeve member 12 to be constantly forced toward the crank case 1 on the body member 5 and therefore the tapered bore of the sleeve member will closely engage with the tapered side walls of the body member and result in an oil-tight connection.

The inner tapered wall of the sleeve 12 has an arcuate annular groove 18 therein arranged to register with the groove 8 on the body portion 5. A radially extending spout 19, forming a part of the sleeve member 12, has its bore 20 connected with the annular groove 18 on the sleeve member 12. This spout 19 extends well above the oil level 4 when in the position shown in Figure 2 and has its outer end turned laterally, as shown at 21.

The opening or mouth 22 of the spout 19 when in the position shown in Figure 2 is normally closed by virtue of the weight of a cap 23 hingedly mounted upon the spout at the opening 22 and therefore precludes the entrance of dust and dirt into the spout when the spout is in an inoperative position, as shown in Figures 1 and 2.

The spout 19 is further provided with a downwardly extending and somewhat sharply pointed lip 24 by means of which the oil which is emitted from the mouth 22 of the spout may drop directly therefrom and not back upon the outer walls of the spout where it may not be readily observed.

The sleeve member 12 is further provided on the exterior wall thereof with a radially extending arm 25 having a transverse bore 26 through its outer end. A rod 27, having one end bent laterally as shown at 28, is secured by the laterally bent portion 28 through the transverse bore 26 to the arm 25, so that longitudinal movement of the rod 27 will occasion a rotative movement of the sleeve 12 upon the tapered body member 5 to the position shown in dotted lines in Figure 2.

Means for limiting the rotative movement of the sleeve 12 relative to the stationary body member 5 is provided in a pin 29 radially extending from the exterior wall of the body member 5 at the rearward portion of the body member, and a second pin on the rear end wall 30 of the sleeve 12, as indicated at 31, which latter pin is arranged to contact the pin 29 when the sleeve is turned substantially as shown in dotted lines in Figure 3. It should be noted at this time that the position of the pins 29 and 31 may be varied to suit the particular purpose to which the oil gauge is to be placed. It is well known that in certain types of motor vehicles, the splash oiling system has characteristics which must be taken into account in determining the arc through which the spout 19 may be permitted to move in order to successfully observe the proper level of oil, or to drain a portion of the oil, as the case may be.

Means for actuating the rod 27 from a point remote to the threaded bore 2 of the crank case is provided in a knurled hand grip 32 disposed on the outer end of the rod, the rod 27 first being projected through the running board shield 33 of the motor vehicle. From this point on the exterior wall of the shield, the driver may easily grip the knob 32 and draw it outwardly to cause a rotative movement of the sleeve upon the body member 5.

Means for yieldably maintaining the spout 19 in the position shown in Figure 2 is provided in a spiral spring 34 mounted concentric with the rod 27, having one end in contact with the inner wall of the shield 33. The opposite end of the spring 34 is held against movement on the rod by means of a pin 35 projected through one of several spaced apart transverse bores 36 on the rod 27.

From the foregoing description of the various parts of the device, the operation thereof may be readily understood. Let us assume that the driver of a vehicle on which my improved oil gauge is installed, is desirous of ascertaining exactly what the level of the oil in the crank case is, so that he may add more oil if the level is below normal, or that he may proceed on his journey with a feeling of confidence if the level is at normal or slightly above. To this end the driver will get out of the vehicle and manually grasp the knob 32 drawing it gradually toward himself against the movement of the spring 34. As he moves the knob 32, he will observe the spout 19 so that the first appearance of oil dripping from the spout or from the lip 24 thereof, may indicate to him that the mouth of the spout is at that time in a plane with the level of the oil. If this dripping of the oil from the spout occurs below the predetermined level of the oil, he will then know that it is necessary to add more oil for the safe operation of the vehicle. It will be noted that as the spout 19 is rotated with the sleeve 12, that the force of gravity acting upon the cap 23 of the spout will cause the cap to remain in a vertical position and therefore move away from the mouth 22 of the spout, so that the oil may pass therethrough.

If the tension of the spring 34 becomes lax so that road vibration might occasion a movement of the rod 27, adjustment of the tension spring may be made by moving the pin 35 into one of the openings 36 adjacent the knob 32 and thereby further compress the spring 34.

I claim:

In an oil gauge having a pivotally mounted spout, means for moving the spout on its pivotal support, comprising an arm extending radially from the pivotal center of the spout, a rod pivotally connected with the outermost end of the arm at one end and having its opposite end projected through a stationary member, a hand grip disposed on the outermost end of the rod, and a spring for yieldingly maintaining the rod in a position whereby the spout extends in a substantially vertical position.

ERNEST DAVIS.